2,743,207

LAMINATED GLASS FABRIC

Adolphe Rusch, Rumson, N. J., assignor to the United States of America as represented by the Secretary of the Army No Drawing. Application November 4, 1953, Serial No. 390,261

9 Claims. (Cl. 154—128)

(Granted under Title 35, U. S. Code (1952), sec. 266)

The invention described herein may be manufactured and used by or for the Government for governmental purposes without the payment to me of any royalty thereon.

This invention relates to an improved laminated glass fabric and a method of making the same.

An object of this invention is to provide a new article of manufacture, a laminated glass fabric which is highly resistant to the action of high concentrations of sulphuric acid, strong alkalies and other chemicals, which has great impact resistance, and is of small bulk and is light in weight.

A further object of the invention is to provide a process for making the fabric above.

Briefly, the process comprises the steps of impregnating a glass fabric such as a glass mat with polystyrene, and curing the fabric so as to provide at least one rough surface thereon. To the rough surface of the stiff cured fabric is then applied at least a second glass fabric impregnated with a laminating resin. The resultant structure is cured under a pressure sufficient to set the laminating resin, and the pressure is then increased and heat applied so as to soften the polystyrene and allow it to flow. When the applied heat and pressure are removed, the polystyrene sets and a tough, hard laminate is obtained. The polystyrene side of the laminate is highly resistant to sulphuric acid and other corrosive chemicals and, as the laminate is glass reinforced, it has extremely good impact resistance. The layers of laminate are firmly bonded together and will not crack or peel.

In order that those skilled in the art may better understand how the present invention may be carried into effect the following example is given by way of illustration.

A glass fabric such as a glass mat is saturated with a solution of polystyrene in an organic solvent by dipping the mat into a bath of the solution, pouring the solution over the mat, or spraying the solution onto the mat, or any other means known in the art for applying a substance in solution to fabric. The saturated mat is placed on a plate and a coarse mesh wire screen (the mesh being about ½ to 1 inch in diameter) is used to compress the mat and decrease its bulk. The solvent evaporates through the mesh and a stiff fabric bonded by polystyrene is obtained. Because of the mesh in the screen, the surface which was adjacent the screen of the cured fabric is quite rough and this allows for a firm bond with the succeeding plies of the laminate. The stiff mat is placed on one plate of a press and a layer of a glass mat impregnated with a laminating resin such as polyester resin is applied to the exposed rough surface thereof. Additional layers of glass mats impregnated with a laminating resin are then applied until a laminate of the desired thickness is built up.

The laminate is cured by applying pressure and heat. Initiall, pressure on the order of 2 to 50 pounds per square inch and heat of approximately 210 degrees Fahrenheit are applied simultaneously for about ¾ of an hour. This causes the polyester resin, which is thermosetting, to set. The pressure is then increased to about 550 to 1000 pounds per square inch and the temperature is changed to approximately 160 to 210 degrees Fahrenheit. This heat and increased pressure, maintained for about 3 to 10 minutes, cause the mat bonded with polystyrene, a thermoplastic substance, to soften and smooth out. The applied heat and pressure are then removed, the polystyrene hardens, and a firmly bonded laminate is obtained.

In the example above, polystyrene is applied to the glass mat in solution with an organic solvent such as ethyl methyl ketone or acetone. However, the polystyrene may be applied in several other forms. For example, it may be applied in aqueous suspension or it may be dissolved in styrene monomer (unpolymerized polystyrene). In the latter case, a typical solution would contain 30 to 35% polystyrene powder dissolved in the monomer and about 1% benzoyl peroxide to act as a catalyst. In order to initially cure, that is, harden the mat saturated with polystyrene dissolved in styrene monomer, heat is required. In some articles actually manufactured, the heat necessary was obtained from a battery of infra-red lamps maintained at a distance of about 6 inches from the article, which heated the article to about 200 to 250 degrees Fahrenheit.

It might be mentioned that heat may also be used to speed the hardening of the fabric saturated with polystyrene in organic solution or polystyrene in aqueous suspension. In the former case, 100 degrees Fahrenheit or so, is appropriate, and in the latter about 200 degrees Fahrenheit.

Some typical laminating resins which may be used in the above described process include polyester resins such as: Laminac, a product of the American Cyanamide Company; Paraplex, a product of Rohm and Haas Company; Selectron, a product of Pittsburgh Plate Glass Company; or Glidpol, a product of the Glidden Company; and epoxy type resins such as: Epon, a product of the Shell Company; Hysol, a product of Houghton Laboratories; or Araldite, a product of Ciba Company.

In the preceding discussion, the glass fabric to which polystyrene was applied was initially cured by placing it between a screen having coarse meshes and a plate. Instead of the screen, there may be substituted a second plate having a rough surface. Also, if the fabric is glass mat, and polystyrene in solution or suspension is used, the mat may simply be placed on a smooth plate and the solvent or water allowed to evaporate therefrom. In all cases, a hard fabric is obtained which has at least one rough surface.

The method described is applicable to glass mat, woven glass cloth or unwoven glass cloth. It may be used for the production of sheets of laminate, as well as laminated articles of various shapes. If it is desired to manufacture a photographic tray made of glass mat, for example, a press is made the shape of the tray and the mat is then formed over the convex portion of the press by blowing the mat in place, or by cutting the mat to shape, or by shaping the mat by hand, or by any other method known in the art. Polystyrene is applied to the mat by any of the methods previously described and a coarse screen or roughened plate is used to provide a rough exterior surface on the cured mat. After the polystyrene has set, the remainder of the laminate is built up and the final product is cured in the manner previously described.

Other products which may be made by the process described herein include storage battery cases, chemical containers and other articles which must be highly resistant to chemicals, and have great impact strength and/or be light in weight.

As used herein, the term "glass fabric" is generic to glass mat, glass cloth and unwoven glass cloth. "Glass mat" refers to random filaments of glass fibres of short length pressed into a sheet. "Glass cloth" refers to conventional woven cloth made either of glass roving or glass yarn and having warp threads running in one direction and filler threads in another direction, the filler threads passing over and under the warp threads. The term "unwoven glass cloth" refers to a fabric having warp threads running in one direction and filler threads in another direction; however, the filler threads are not woven under and over the warp threads. As in the case of glass cloth, the threads may consist of either yarn or roving.

While there has been described what is at present considered the preferred embodiment of the invention, it will be obvious to those skilled in the art that various changes and modifications may be made therein without departing from the invention and it is aimed in the appended claims to cover all such changes and modifications as fall within the true spirit and scope of the invention.

What is claimed is:

1. A method of manufacturing a laminated article comprising the steps of impregnating a first glass fabric with polystyrene, curing the fabric so as to provide at least one rough surface thereon, applying to said rough surface a second glass fabric impregnated with a laminating resin, curing the resultant structure under pressure sufficient to set the laminating resin, increasing said pressure and applying heat to said structure so as to soften the polystyrene, and removing the applied heat and pressure to allow the polystyrene to set.

2. A method of manufacturing as set forth in claim 1, in which said first fabric is cured by placing it in a platen comprising one smooth plate and one plate having a rough surface.

3. A method of manufacturing as set forth in claim 1, in which said first and second fabrics are glass mat.

4. A method of manufacturing as set forth in claim 3, in which said first fabric is cured by compressing it between a smooth plate and a screen having a coarse mesh.

5. A method of manufacturing as set forth in claim 1, in which said first fabric is impregnated with polystyrene by applying to it an aqueous emulsion of polystyrene.

6. A method of manufacturing as set forth in claim 1, in which said first fabric is impregnated with polystyrene by applying to it a solution of polystyrene in an organic solvent.

7. A method of manufacturing as set forth in claim 1, in which said first fabric is impregnated with polystyrene by applying to it a solution of polystyrene powder and a catalyst dissolved in styrene monomer.

8. A method of manufacturing a laminated article comprising the steps of impregnating a first glass fabric with polystyrene, curing said fabric between the plates of a press, one of said plates having a smooth surface and the other a rough surface, placing on the rough surface of the cured fabric a layer of laminating resin, applying a second glass fabric to the rough surface of the cured fabric, applying a layer of laminating resin to the exposed surface of the second glass fabric, repeating the preceding two steps until the desired number of plies are built up, placing the resultant structure between the plates of a press and applying sufficient heat and pressure to set the laminating resin, increasing said pressure and applying heat so as to soften the polystyrene and allow it to flow, and removing the applied heat and pressure to allow the polystyrene to set.

9. A method of manufacturing a laminated article comprising the steps of impregnating a first sheet of glass mat with a solution of polystyrene in an organic solvent, curing the mat by compressing it between a smooth plate and a screen having a coarse mesh and allowing the solvent to evaporate, whereby a hard mat is obtained having one smooth surface and one rough surface, stacking on the rough surface of said mat a plurality of glass mats saturated with polyester resin, curing the resultant structure by placing it between the plates of a press and applying a pressure of approximately 2 to 50 pounds per square inch and heat of approximately 210 degrees Fahrenheit for about ¾ of an hour, increasing said pressure to 550–1000 pounds per square inch and maintaining the increased pressure for approximately 3 to 10 minutes while heating to approximately 160°–210° Fahrenheit, whereby the polystyrene softens, and then removing the applied heat and pressure.

References Cited in the file of this patent

UNITED STATES PATENTS

| 2,212,400 | Letteron | Aug. 20, 1940 |
| 2,653,111 | Murray | Sept. 22, 1953 |
| 2,683,105 | Forbes et al. | July 6, 1954 |
| 2,703,774 | Morrison | Mar. 8, 1955 |

OTHER REFERENCES

DeMarco: Styrene-Glass Fiber Combinations, pp. 19–23, of Plastics Industry, Aug. 1951.

McMillan: Abstract of appln. Ser. No. 638,894, publ. July 26, 1949.